United States Patent [19]

Gergely

[11] Patent Number: 4,538,278

[45] Date of Patent: Aug. 27, 1985

[54] APPARATUS AND METHOD FOR GENERATING LIGHT IN THE NEAR ULTRAVIOLET TO INFRARED RANGE

[75] Inventor: John S. Gergely, Ponca City, Okla.

[73] Assignee: Conoco Inc., Ponca City, Okla.

[21] Appl. No.: 414,503

[22] Filed: Sep. 2, 1982

[51] Int. Cl.³ ............................................. H01S 3/091
[52] U.S. Cl. ..................................... 372/70; 307/427; 350/96.18; 372/5; 372/53; 372/108
[58] Field of Search ................ 350/96.1, 96.15, 96.18; 372/51, 53, 100, 70, 21, 22, 5, 54, 108; 307/425, 427; 250/372

[56] References Cited

U.S. PATENT DOCUMENTS

| | | | |
|---|---|---|---|
| 2,720,593 | 10/1955 | Richards et al. | 250/41.9 |
| 2,765,411 | 10/1956 | Kerr | 250/71 |
| 2,931,905 | 4/1960 | Caha et al. | 250/71.5 |
| 3,161,769 | 12/1964 | McPherson | 250/13.5 |
| 3,222,520 | 12/1965 | McNaney | 250/71.5 |
| 3,225,193 | 12/1965 | Hilton et al. | 250/71.5 |
| 3,567,985 | 3/1971 | Goodman | 313/70 |
| 3,582,814 | 6/1971 | Duguay et al. | 372/51 |
| 3,675,151 | 7/1972 | Mack | 372/53 |
| 3,717,762 | 2/1973 | Grenier et al. | 250/71.5 R |
| 3,753,148 | 8/1973 | Billman | 372/53 |
| 3,924,201 | 12/1975 | Crow | 372/100 |
| 4,410,235 | 10/1983 | Klement et al. | 350/96.18 |
| 4,420,219 | 12/1983 | Muchel | 350/96.18 |

OTHER PUBLICATIONS

Bokut et al., "Spatial Scanning of Frequency-Doubled Laser Beams Using Nonlinear Crystals," *J. Appl. Spectrosc.*, vol. 29, No. 5, (Nov. 1978), pp. 1308–1312.
Article entitled "Doubling Flashlamp-Pumped Dye Output, Los Alamos Obtains 50 mj at 270 nm," *Laser Focus*, Jan. 1977, p. 32.
Article entitled "Remote Analysis with Lasers and Fibers," *Optical Spectra*, May, 1980, p. 18.
Article entitled "Second Harmonic Generation in 90° Phase-Matched KDP Isomorphs," *IEEE Journal of Quantum Electronics*, Aug. 1973, pp. 855, 856.
Article entitled "Frequency Doubling Crystals—Unscrambling the Acronyms," by R. S. Adhav and M. Orszag, Quantum Technology, Ltd., Agincourt, Ontario.
Article entitled "Efficient Second Harmonic Generation in ADP with Two Fluorescein Dye Lasers," *Journal of Applied Physics*, vol. 42, No. 12, Nov. 1971, pp. 5171–5172.
Article entitled "Measurements of $SO_2$ Absorption Coefficients Using a Tunable Dye Laser," *Journal of Applied Physics*, vol. 46, No. 7, Jul. 1975, pp. 3040–3043.

*Primary Examiner*—James W. Davie
*Attorney, Agent, or Firm*—William J. Miller

[57] ABSTRACT

A source of linearly polarized light having a wavelength range of about 550 to 1100 nanometers provides light into one end of an optical fiber. A nonlinear crystal of the type that mixes the frequency of light passing therethrough is positioned adjacent the other end of the fiber. The fiber transmits light from the source to the crystal which increases its frequency up to 100%, dependent upon crystal selection providing light in the 250–550 nanometer wavelength range. Adjusting the radial orientation of the crystal with respect to the fiber optimizes conversion of light to the 250–550 nanometer range. Such light is shined into organic dye which emits fluorescent light in the range of about 400 to 1000 nanometers dependent upon the type of dye selected.

9 Claims, 8 Drawing Figures

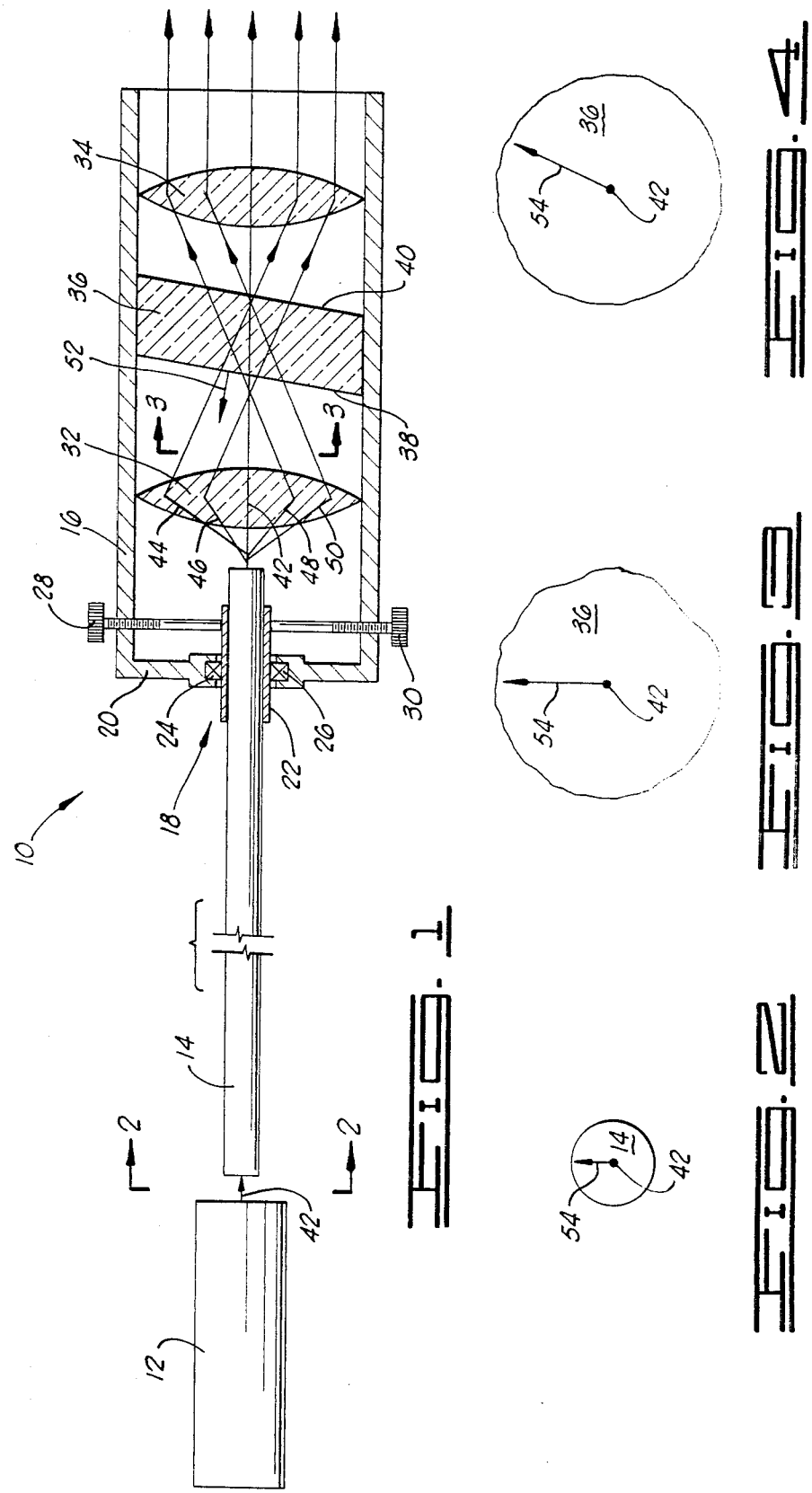

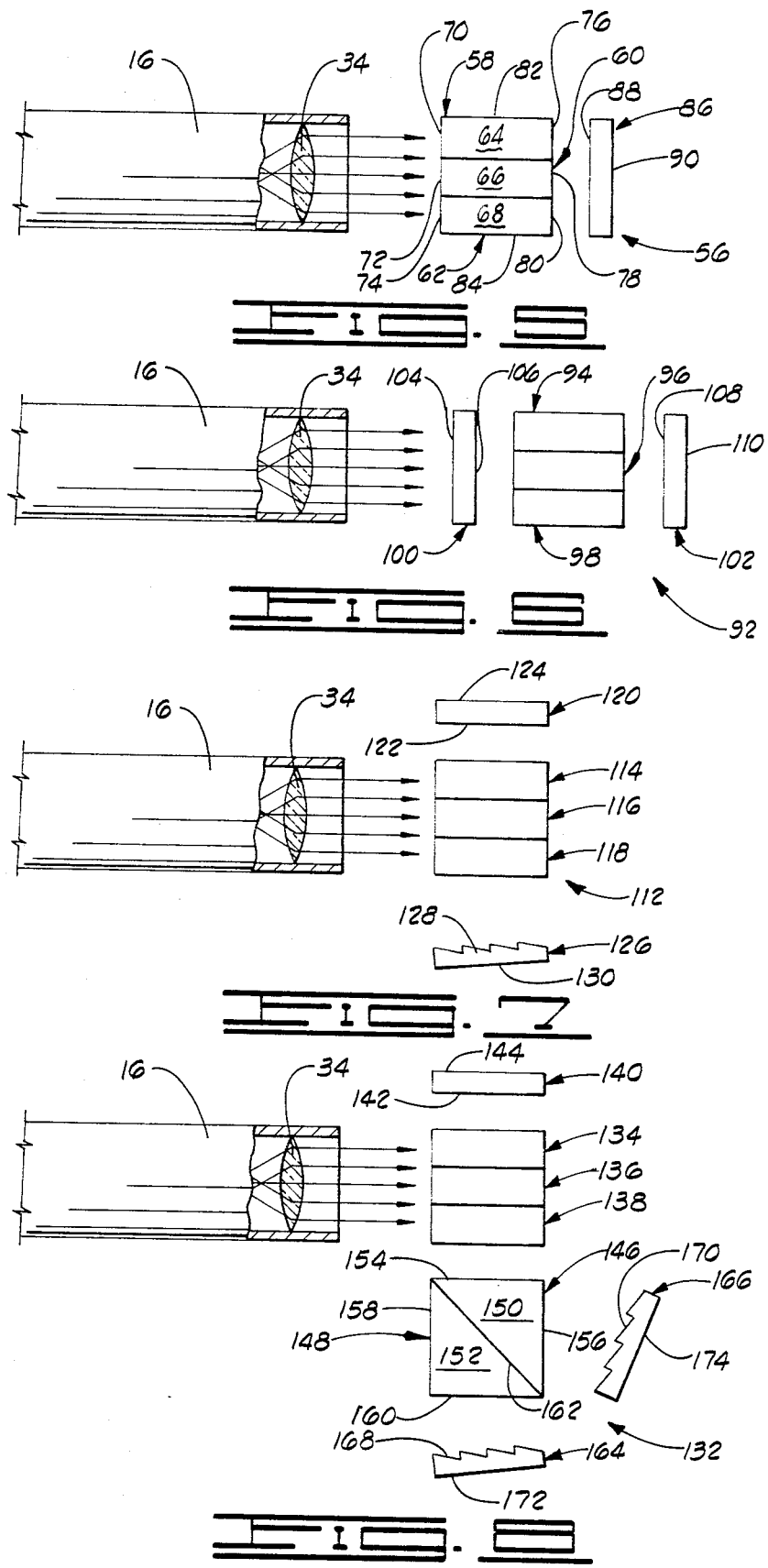

APPARATUS AND METHOD FOR GENERATING LIGHT IN THE NEAR ULTRAVIOLET TO INFRARED RANGE

BACKGROUND AND SUMMARY OF THE INVENTION

The instant invention relates to an apparatus and method for generating light in the near ultraviolet to infrared range and more particularly to such an apparatus and method which utilizes a source of linearly polarized light to generate such a range of light.

There are several instances in which it is desirable to radiate samples of a substance with light in the near ultraviolet to infrared range. For example, in pollution monitoring, it may be desirable to shine such light onto a sample of ambient air or water in order to test for the type and amount of pollutants in the sample. Also, in exploration for minerals in the earth, bore holes are often drilled in order to extract samples for radiation with selected frequencies of light in order to derive information about the mineral content of the sample. A cheaper and more detailed sampling of material in the bore hole may be undertaken if a light source which emits light of the desired frequency and related testing equipment is lowered into the bore hole. This obviates the need for extracting a sample and facilitates sampling of the bore hole at selected increments.

In the above-described applications for utilizing light in the near ultraviolet to infrared spectrums, it may be necessary for the light to be emitted at a relatively inaccessible location, e.g., in a bore hole or under water. It is known that transmission of light along certain optical fibers is optimum in the 600 to 800 nanometer range. Light of a wavelength outside the optimum range is subject to attenuation. Although it may be desirable to obtain light in the range of approximately 300 to 600 nanometers at a remote location, transmission of light in such a range along an optical fiber subjects the light to a great deal of attenuation during such transmission.

It is a general object of the present invention to provide a source of light in the near ultraviolet to infrared range at a location remote from a linearly polarized light source which is used to generate such light.

It is a more specific object of the invention to provide such a method and apparatus which utilizes an optical fiber to transmit the linearly polarized light substantially at its optimum frequency for fiber transmission.

The apparatus includes a source of linearly polarized light and an optical fiber for transmitting such light therealong. A frequency-doubling crystal is positioned adjacent one end of the fiber so that such transmitted light passes therethrough. The transmitted light is substantially in the 500 to 1100 nanometer wavelength range which is optimum for transmission along the optical fiber. The transmitted light which emerges from the crystal includes light in the ultraviolet wavelength range, such light being twice the frequency of the transmitted light. The emergent near ultraviolet or ultraviolet light is shined into an organic dye of the type which fluoresces responsive to irradiation with light in certain frequency ranges. By proper selection of dyes, fluorescent light may be produced in the near ultraviolet to infrared range. The doubled light output of the crystal may be made to coincide with the absorption peak of the dye. By so doing, more doubled light will be absorbed resulting in greater dye fluorescence and in some cases lasing. A frequency-mixing crystal may be used in lieu of the frequency-doubling crystal to obtain further variation in the wavelength of the light shined into the dye.

In one embodiment of the invention, the fluorescent light emerging from the dye is passed through a conventional band pass filter to produce light in a selected relatively narrow wavelength band.

In another embodiment of the invention, mirrors are placed on opposite sides of the dye in order to generate laser light.

In still another embodiment of the invention, a mirror is placed on one side of the dye opposite a grating on the other side. Rotation of the grating varies the wavelength of light which is reflected into the dye cell and thus varies the wavelength of the laser light output.

In yet another embodiment of the invention, a pair of gratings are so utilized in order to generate laser light of two selected wavelengths.

Thus, it is a more specific object of the invention to provide a light source having a selected narrow wavelength in the ultraviolet to infrared range at a location remote from a linearly polarized light source which is used to generate such narrow wavelength light.

It is another specific object of the invention to provide such a source which emits laser light.

It is still another specific object of the invention to provide such a source which emits laser light of a selected wavelength.

It is yet another specific object of the invention to provide such a source which emits laser light having two selected wavelengths.

These and other attendant advantages and objects of the instant invention will become more fully apparent as the following description of a preferred embodiment of the invention is read in view of the accompanying drawings.

FIG. 1 is a view of a portion of a preferred embodiment of the invention (shown partially in schematic form), part of the view of FIG. 1 being shown in cross-section.

FIG. 2 is an enlarged partial view taken along line 2—2 in FIG. 1.

FIG. 3 is a partial view taken along line 3—3 in FIG. 1.

FIG. 4 is the view of FIG. 3 with the optical fiber having a slightly different radial orientation than in FIG. 3.

FIG. 5–FIG. 8 are each a view of a portion of a different embodiment of the invention (shown partially in schematic form) for use with the portion shown in FIG. 1.

DETAILED DESCRIPTION OF THE INVENTION

Indicated generally at 10 in FIG. 1 is apparatus constructed in accordance with the instant invention for generating light in the 250–550 nanometer wavelength range. Included therein is a conventional laser 12 which acts in a well-known manner to generate a source of linearly polarized light for transmission within a conventional optical fiber 14. In the instant embodiment of the invention, light so generated is substantially in the 600 to 800 nanometer wavelength range. Light in this range is optimum for transmission along fiber 14 since attenuation of such light is minimized during transmission.

Fiber 14 is connected to a cylindrical housing 16 via a slip ring, indicated generally at 18. Slip ring 18 is mounted on a rear circular portion 20 of housing 16 which serves to enclose one end of housing 16 around the slip ring.

The slip ring includes a cylindrical tube 22 which is snugly fitted about the circumference of fiber 14. A plurality of bearings, two of which are bearings 24, 26 are contained within portion 20 about the circumference of tube 22 and serve to rotatably support the tube (and hence the optical fiber).

Lock screws 28, 30 are each threadably engaged in bores contained in and passing through housing 16. The lower end of each of lock screws 28, 30 abut against tubing 22 and serve to restrain the tubing from rotation.

A pair of conventional lenses 32, 34 are each mounted about their circumference on the interior of housing 16. Although not visible in the drawing, conventional means are provided to enable moving lenses 32, 34 along the axis of housing 16, that is, toward and away from end portion 20.

Also mounted about its circumference within the housing is a conventional frequency-doubling crystal 36. Included within the crystal are a front surface 38 and a rear surface 40. Crystal 36 is a nonlinear crystal of the type which affects light passing therethrough by doubling its frequency. Examples of such crystals are potassium dihydrogen phosphate and ammonium dihydrogen phosphate. Other nonlinear crystals, which may be effectively used in accordance with the instant invention, are frequency-mixing crystals which affect light passing therethrough by increasing its frequency up to 100%. As used herein, "nonlinear crystals" refer to both frequency-mixing and frequency-doubling crystals.

Crystal 36 is surrounded by an index-matching fluid which is contained in the space between lenses 32, 34. The fluid has an index of refraction close to that of lenses 32, 34 and of crystal 36, and as will later become more fully apparent, helps to minimize relection losses of light passing through housing 16.

A light ray 42 is indicated in FIG. 1 with an arrow as shown. Ray 42 indicates the direction of propagation of a ray of light emitted from fiber 14 when laser 12 is energized. Additional rays 44, 46, 48, 50 are likewise indicated by arrows and serve to indicate the direction of propagation of other light rays emitted from fiber 14. A normal vector 52 is shown to indicate an axis perpendicular (normal) to surface 38. In FIGS. 2 and 3, an electric-field vector 54 is shown to indicate the polarization of the electric field propagating along ray 42.

Indicated generally at 56 in FIG. 5 is a portion of one embodiment of the invention for use with the apparatus shown in FIG. 1. In the embodiment of FIG. 5, dye cells 58, 60, 62 are positioned in the path of light emitted from housing 16. Each of the cells includes a first side 64, 66, 68 and a second side (not visible) opposite its first side. The cells likewise include a front end 70, 72, 74 and an opposing rear end 76, 78, 80, respectively. The front ends 70, 72, 74 substantially span the open end of housing 16 and are positioned so that light rays exiting housing 16 strike front ends 70, 72, 74 substantially normal thereto. Each of the cells includes a top, like top 82 on cell 64 and a bottom, like bottom 84 on cell 62. Each cell's top, bottom, sides and ends are made of quartz and form a container in which an organic dye is contained and can be recirculated in a closed path using, for example, a centrifugal pump, not shown. This circulates fresh dye in the way of the beam emerging from housing 16 since the dye deteriorates as it is exposed to the light beam. In the instant embodiment of the invention the dye being one known as $C10_2$. The cells are stacked with the bottom of cell 66 resting on the top of cell 68 and the bottom of cell 64 resting on the top of cell 66.

A conventional filter 86 is positioned adjacent dye cells 64, 66, 68. Filter 86 is substantially planar and includes a front surface 88 and a rear surface 90. Front surface 88 is positioned opposite and substantially parallel with rear ends 76, 78, 80 of cells 64, 66, 68, respectively. Filter 86 is of conventional construction and is of the type which passes only a selected bandwidth of light when light is shined onto surface 88. The only light which passes through filter 86 is that which consists of light in the wavelength range which the filter is designed to pass. Filter 86 is referred to herein as means for passing selected bandwidths of light.

Indicated generally at 92 in FIG. 6 is a portion of another embodiment of the invention also for use with the apparatus shown in FIG. 1. Included therein are dye cells 94, 96, 98, a first mirror 100, and a second mirror 102. Dye cells 94, 96, 98 are of the same size and construction as dye cells 58, 60, 62 in FIG. 5, and are oriented with respect to housing 16 in the same manner. In the embodiment of FIG. 6, dye cells 94, 96, 98 each have the organic dye $C10_2$ sealed therein.

Mirror 100 is a conventional mirror and is substantially planar in shape having a front surface 104 and a rear surface 106. Mirror 100 is interposed between housing 16 and cells 94, 96, 98 so that light leaving housing 16 passes through mirror 100 prior to striking the dye cells. Mirror 100 is of the type which transmits through the mirror substantially all light in the ultraviolet range, i.e., light having a wavelength below approximately 400 nanometers, and reflects substantially all light having a wavelength above the ultraviolet range.

Mirror 102 is substantially planar in shape and includes a front surface 108 and a rear surface 110. Front surface 108 is opposite from and is substantially parallel with each of the rear ends of dye cells 94, 96, 98. Mirrors 100, 102 form a laser cavity. Mirror 102 is approximately 10% to 30% transmissive at the desired lasing wavelength.

In FIG. 7, indicated generally at 112, is a portion of still another embodiment of the invention for use with the apparatus of FIG. 1. Included therein are dye cells 114, 116, 118. Each of dye cells 114, 116, 118 are of the same construction and include the same dye, $C10_2$, as each of the two previously described embodiments. Dye cells 114, 116, 118 are oriented with respect to housing 16 as in the embodiment of FIG. 5. A mirror 120, such being of the same type as mirror 102 in FIG. 6, is positioned over the top of dye cell 114. Mirror 120 presents a front surface 122 toward the top of dye cell 114. Surface 122 is substantially parallel with the top of cell 114. Mirror 120 further includes a rear surface 124.

A conventional grating 126 is of substantially planar construction and includes a front surface 128 and a rear surface 130. Grating 126 is referred to herein as means for reflecting a selected wavelength of light. There are several other optical components which will serve the same function equally well, e.g., a prism or a birefringent filter. Front surface 128 is opposite substantially all of the bottom of dye cell 118. When light is shined onto front surface 128, grating 126 reflects only a selected narrow wavelength of the light dependent upon the angle at which the light strikes surface 128. By varying the angle at which the light strikes the front surface of the grating, the wavelength of light reflected from the front surface may be accordingly varied.

Indicated generally at 132 in FIG. 8 is a portion of yet another embodiment of the invention also for use with the apparatus of FIG. 1. Included therein are dye cells 134, 136, 138. Each of the cells are constructed in accordance with the previously described dye cells and are oriented with respect to housing 16 in the same manner as cells 58, 60, 62 in FIG. 5.

A mirror 140 includes a front surface 142 and a rear surface 144. Mirror 140 is of the same type as mirror 120 and is oriented with respect to dye cells 134, 136, 138 the same way that mirror 120 is oriented with respect to dye cells 114, 116, 118.

Two prisms 146, 148 are positioned beneath the dye cells. The prisms are referred to herein as means for splitting a light beam. Each prism includes an end 150, 152, such being in a triangular configuration, and an opposing triangular end (not visible in FIG. 8) opposite thereto. Each prism also includes rectangular sides 154, 156 for prism 146, and sides 158, 160 for prism 148. Side 154 is opposite and is substantially parallel with the bottom of dye cell 138. Each prism includes a third side which is positioned adjacent the other prism's third side to form an interface 162 between the prisms.

Also included in the embodiment of FIG. 8 are gratings 164, 166, each having a front surface 168, 170, respectively, and a rear surface 172, 174, respectively. Each of gratings 164, 166 are constructed and function in the same manner as grating 126 in FIG. 7. Surface 168 is opposite side 160 of prism 152 while surface 170 is opposite side 156 of prism 150.

In operation, laser 12 emits linearly polarized light which is shined into fiber 14 for transmission into housing 16. When the light emerges from fiber 14 into housing 16, it propagates in a manner indicated by rays 42, 44, 46, 48, 50. It is to be appreciated that dependent upon the position of lens 32 with respect to the end of bundle 14, the rays may be collimated (placed into parallel alignment) or focused (converged) to varying degrees into the doubling crystal. In FIG. 1, lens 32 is positioned to focus light rays emerging from bundle 14.

Since the light emitted from the laser is linearly polarized, such emitted light includes an electric-field vector which lies along a fixed line normal to the direction of propagation of the light. Due to the conventional structure of fiber 14, the linear polarization as well as the substantial degree of such polarization of light is preserved after transmission through the fiber. As can be seen, electric-field vector 54, in FIG. 3 retains substantially the same direction of polarization as that of light entering fiber 14, the orientation of such entering light being shown by vector 54 in FIG. 2.

In order to maximize doubling of light by crystal 36, it is necessary for light entering the crystal to be aligned with the optic axis of the crystal. In addition, to increase the amount of light being doubled, surface 38 may be cut so that vector 54 lies in the plane of incidence while at the same time being aligned with the optic axis of the crystal. Light so entering the crystal is parallel polarized light. The plane of incidence is a plane which is normal to surface 38 and which includes a nonaskew the ray defining the direction of light propagation—for example, ray 42.

In order to minimize reflective losses it is desirable for light rays approaching crystal surface 38 to do so at Brewster's angle. The tangent of this angle is defined as being N2 divided by N1, where N2 is the index of refraction of the crystal and N1 is the index of refraction of the index-matching fluid which, as will be recalled, is contained in the volume between lenses 32, 34. Ideally, if the index of refraction of the crystal and the fluid are very nearly the same, reflective losses are minimized regardless of the angle of approaching light rays.

As can be seen in FIG. 1, depending upon the axial position of lens 32 within housing 16 and depending upon the angle of crystal surface 38 with respect to the housing, light rays approach the crystal surface from a plurality of angles within a converging cone of light. Thus, all of the rays may not be parallel polarized nor may they all approach the crystal front at Brewster's angle. However, when lens 32 is adjusted to provide collimated light entering crystal 36, the impinging light will no longer be confined within a cone, but rather within a cylinder. In this case, all of the light entering the crystal is parallel polarized and if crystal surface 38 is cut at Brewster's angle, the incident ray will strike the crystal surface at Brewster's angle. Maximum doubling will occur somewhere between fully collimated light entering the crystal and light being focused within the crystal by lens 32. To optimize production of ultraviolet light emerging from housing 16 through lens 34, thumb screws 28, 30 are loosened and tubing 22 is rotated until the quantity of light in the ultraviolet range which emerges from housing 16 is at a maximum.

Lens 34 may be moved along the axis of the housing for collimating, diverging or focusing the light emitted from the crystal.

When utilizing the portion of the invention depicted in FIG. 4 with the embodiment of FIG. 5, light rays emitted from housing 16 as described above shine onto the front ends 70, 72, 74 of cells 64, 66, 68, thus shining light into the dye. The organic dye $C10_2$ has an excitation bandwidth of approximately 350 to 470 nanometers. When light in this bandwidth shines into the dye, the dye fluoresces in the bandwidth of approximately 460 to 510 nanometers. Thus, when the ultraviolet light emitted from housing 16 strikes the dye cells, fluorescent light is emitted by the dye contained therein. Filter 86 band passes a selected narrow bandwidth of light in the 460 to 510 nanometer range. Filter 86 may be selected to pass, e.g., light in the approximately 470–480 nanometer range so that when the fluorescent light strikes surface 88, the only light passing through the filter and emerging from surface 90 is in the 470 to 480 nanometer range.

In the embodiment of FIG. 6, when light in the ultraviolet range emerges from housing 16, it strikes surface 104 of filter 100. Since filter 100 is substantially transmissive to ultraviolet light, the light passes therethrough and into the dye contained in cells 94, 96, 98. When the $C10_2$ dye fluoresces, such fluorescent light is reflected from surfaces 106, 108 on mirrors 100, 102, respectively, back into the dye. It is known that reflecting such fluorescence back into the dye forces certain of the molecules in the dye to emit laser light. The laser light strikes surface 108 of mirror 102 and a certain percentage passes therethrough. The frequency of such laser light is determined by the characteristics of mirror 102 and the dyes being used.

In the embodiment of FIG. 7, fluorescent light emitted by the dye cells strikes grating 126 and a selected wavelength of such light is reflected back into the dye cells. Reflecting a selected wavelength of the fluorescent light into the dye cells causes lasing action in the dye medium. Fluorescent light is also reflected by surface 122 of mirror 120 back into the cell to aid in causing lasing action of the molecules. By selecting a certain wavelength of the fluorescent light for reflection back into the cell, a selected frequency of laser light may be generated by the dye. Angulation of surface 128 with respect to surface 12 of mirror 120 varies the wavelength of fluorescent light reflected back into the cell and thus varies the frequency of the laser light produced by the dye. Such laser light strikes surface 122 of mirror 120 and a certain amount passes therethrough.

In the embodiment of FIG. 8, fluorescent light emitted by the dye cells passes through prism 146 and strikes interface 162. Half of such light continues downwardly through prism 148 to strike grating 164. The other half of such light is reflected by interface 162 to strike grating 166. Each of the gratings 164, 166 may be placed at a selected angle with respect to the prisms in order to reflect a selected wavelength back into its associated prism. The reflected wavelength from grating 164 passes through prism 148, across interface 162, through prism 146 and back into the dye. The beam reflected from grating 166 passes into prism 146 and strikes interface 162 to be reflected back into the dye cells.

The great majority of fluorescent light striking surface 142 of mirror 140 is likewise reflected back into the cell. By placing gratings 164, 166 at selected angles, laser light having two selected wavelengths may be emitted from the dye to pass through mirror 140.

It is to be appreciated that any organic dye of the type which fluoresces may be utilized in the instant invention. Other such dyes, e.g., oxazine 1, nile blue, C1, C2, etc., have different absorption spectrums and different spectrums in which fluorescent light is emitted. These dyes may be mixed together and placed into a single cell or, alternatively, each of the three cells in FIGS. 5-8 may contain different dyes. By appropriate selection of filters, mirrors and gratings, and by appropriate selection and mixing of dyes, the instant invention may be used to generate light in the near ultraviolet to infrared spectrum.

It is to be appreciated that modifications and additions may be made to the instant embodiment of the invention without departing from the spirit of the invention which is defined in the following claims.

I claim:

1. Apparatus for generating light of selected wavelength in the near ultraviolet to infrared wavelength range comprising:
    a light source of linearly polarized light having a wavelength range of about 550–1100 nanometers;
    a non-linear crystal;
    an optical fiber having one end positioned adjacent said light source to permit transmission of said light within said fiber and the other end positioned adjacent said crystal to beam such transmitted light therethrough;
    a dye cell positioned adjacent said crystal intercepting light therefrom, said cell including organic dye having an absorption spectrum in the ultraviolet range and a fluorescence emission spectrum in the near ultraviolet to infrared range; and
    optical output means for passing only selected bandwidths of fluorescent light emitted from said dye cell.

2. The apparatus of claim 1 wherein said optical output means comprises:
    a first mirror positioned on one side of said cell and a second mirror opposite said first mirror on the other side of said cell, said mirrors being of the type to effect lasing action during dye fluorescence.

3. The apparatus of claim 2 wherein said first mirror is positioned between said crystal and said dye and is substantially transmissive to light in the ultraviolet wavelength range and is substantially reflective to light in the fluorescence emission wavelengths of the dye and wherein said second mirror is partially reflective and partially transmissive to such fluorescence emission wavelengths.

4. The apparatus for claim 1 wherein said optical output means comprises:
    a mirror positioned on one side of said cell and means for reflecting a selected wavelength of light opposite said mirror on the other side of said cell.

5. The apparatus of claim 1 wherein said optical output means comprises:
    a mirror positioned on one side of said cell, means for splitting a light beam opposite said mirror on the other side of said cell, and means for reflecting a selected wavelength of each of the split beams positioned adjacent said splitting means.

6. The apparatus of claims 4 or 5 wherein said means for reflecting a selected wavelength is a grating.

7. The apparatus of claims 4 or 5 wherein said means for reflecting a selected wavelength is a prism.

8. The apparatus of claim 1 which is further characterized to include:
    means for selectively fixing the orientation of said optical fiber about its longitudinal axis relative to said non-linear crystal.

9. The apparatus of claim 8 which further includes:
    means including a lens for selectively adjusting the focus of transmitted light from said optical fiber; and
    index-matching fluid in retention between said lens and said non-linear crystal.

* * * * *